Patented Dec. 14, 1943

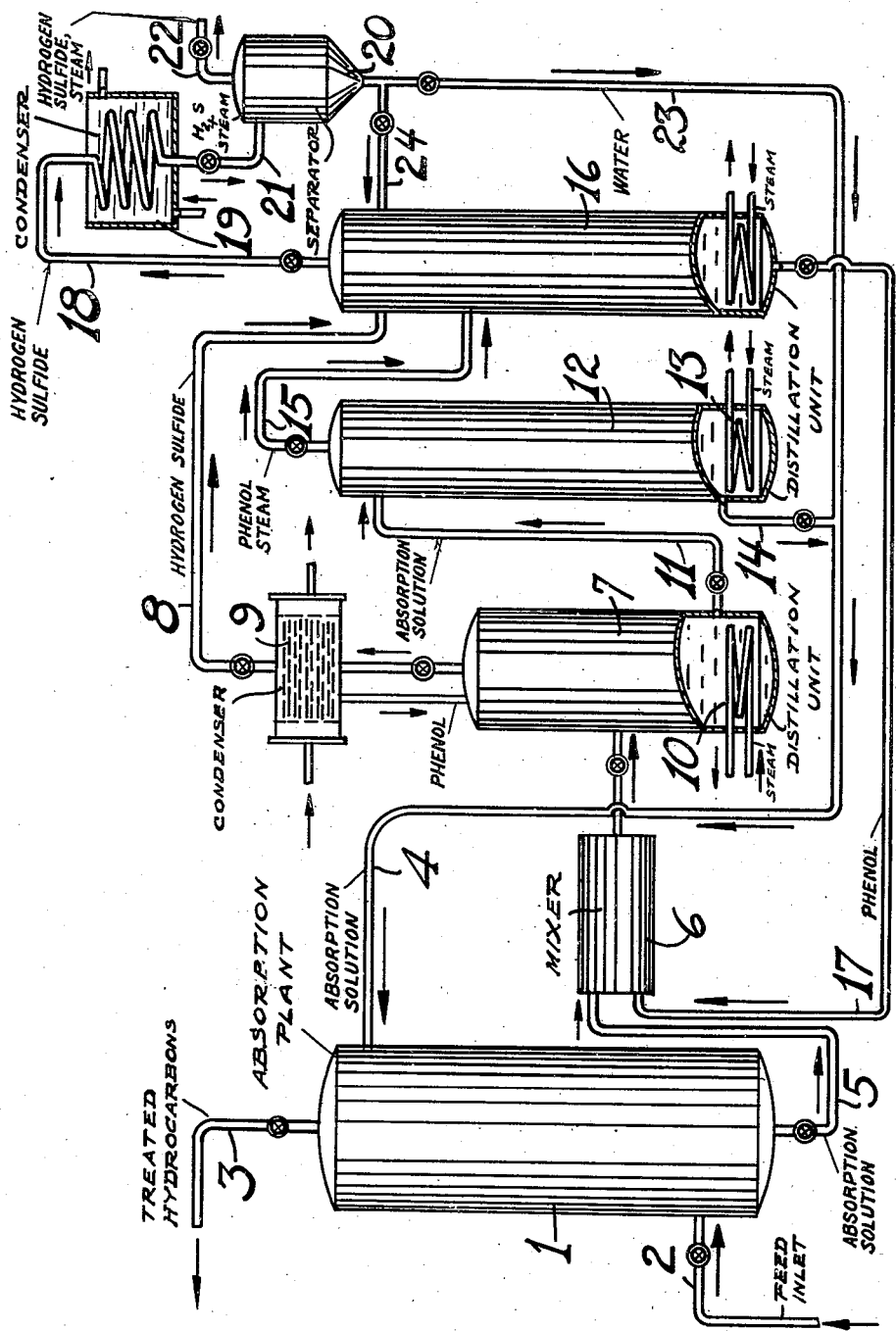

2,336,651

UNITED STATES PATENT OFFICE 2,336,651

REMOVAL OF SULPHUR COMPOUNDS UTILIZING ALKALI METAL PHOSPHATE SOLUTION AND PROCESS FOR THE REGENERATION OF THE SAME

Reginald K. Stratford, Corunna, Ontario, Canada, assignor to Standard Oil Development Company, a corporation of Delaware Application August 3, 1940, Serial No. 350,842

3 Claims. (Cl. 23—181)

The present invention relates to the refining of mineral oils. The invention is especially concerned with a process for the removal of the sulphur compounds from petroleum hydrocarbons utilizing absorption solutions and more particularly relates to an improved process for the regeneration of the same. In accordance with the present process, sulphur compounds, particularly hydrogen sulphide, are removed from petroleum hydrocarbons by means of an alkali metal phosphate absorption solution. The resulting spent absorption solution is handled in a manner to completely and efficiently remove the hydrogen sulphide and to regenerate the absorption solution by a process utilizing a phenol.

It is well known in the art to remove sulphur compounds from gases and liquids containing the same by various methods. A usual method for the removal of hydrogen sulphide from petroleum hydrocarbons is to contact the hydrocarbons with absorption solutions which have a preferential selectivity for the sulphur compounds as compared to the petroleum hydrocarbons. Thus, for example, it is known to remove hydrogen sulphide and related sulphur compounds from petroleum hydrocarbon gases and liquids by countercurrently contacting the same with various absorption solutions which have a preferential selectivity for the hydrogen sulphide as compared to the petroleum hydrocarbons. Solutions of this character are, for example, the various ethanol amines and the like. A particularly desirable class of solutions for the removal of hydrogen sulphide from petroleum hydrocarbons is the alkali metal phosphates, as for example, tri-potassium phosphate.

However, when utilizing these latter solutions, which are entirely satisfactory in so far as their ability to selectively absorb hydrogen sulphide is concerned, difficulties are encountered in economically and efficiently removing the hydrogen sulphide and regenerating the spent solution. The usual processes in which spent absorption solutions are subjected to various elevated temperature and pressure conditions adapted to remove the hydrogen sulphide overhead as a gas are not entirely satisfactory due to the relatively strong solvent power the alkali metal phosphate solution exhibits for the hydrogen sulphide at elevated temperatures. Thus, in order to secure relatively complete removal of the hydrogen sulphide from the absorption solution it has heretofore been necessary to employ relatively severe distillation conditions and to utilize a relatively large quantity of steam which considerably increases operating difficulties and costs. I have now discovered a process by which spent alkali metal phosphate solutions utilized in the removal of hydrogen sulphide and related compounds from petroleum hydrocarbons may be readily and efficiently regenerated.

The process of my invention may be readily understood by reference to the attached drawing illustrating modifications of the same. For purposes of illustration it is assumed that the petroleum hydrocarbons comprise petroleum hydrocarbon gases containing an appreciable amount of sulphur compounds, particularly hydrogen sulphide, and that the absorption solution comprises tri-potassium phosphate. The feed gases are introduced into absorption zone 1 by means of feed line 2. These gases flow upwardly through absorption zone 1 and contact a countercurrently flowing aqueous solution of tri-potassium phosphate which is introduced into absorption zone 1 by means of line 4. Efficient contact between the countercurrently flowing phases is secured by adequate means such as contact masses, pierced plates, distributing plates, and the like. It is to be understood that absorption zone 1 may comprise any number of absorption towers, batch treaters, stages, mixers, or settlers arranged in any desirable manner. The scrubbed gases substantially free of hydrogen sulphide are removed from the top of absorption zone 1 by means of line 3 and handled in any manner desirable.

The spent tri-potassium phosphate solution containing dissolved therein the absorbed hydrogen sulphide is withdrawn from the bottom of absorption zone 1 by means of line 5 and passed to mixer 6 in which it is mixed with a quantity of a phenol which is introduced by means of line 17 and which for the purposes of description is taken to be mono-hydroxy phenol. The mixture is withdrawn from mixer 6 and passed to distillation unit or concentrator 7. Temperature and pressure conditions are maintained in concentrator 7 adapted to remove overhead by means of line 8 substantially the entire quantity of hydrogen sulphide. If desired, a partial condenser 9 may be employed to provide phenol reflux. Heat is supplied to unit 7 by means of steam heating coil 10 or an equivalent means. The potassium phosphate solution substantially completely free of hydrogen sulphide is removed from distillation unit 7 by means of line 11 and passed into distillation unit 12 in which substantially complete removal of the phenol is secured, preferably by means of open steam which is introduced by means of line 13. The potassium phosphate solution free of hydrogen sulphide and phenol is withdrawn from the bottom of distillation unit 12 by means of line 14 and recycled to absorption plant 1 by means of line 4.

The phenol and steam stream removed overhead from distillation unit 12 by means of line 15, along with the overhead stream from distillation unit 7, are cooled and passed into distillation unit 16. Temperature and pressure conditions are maintained on distillation unit 16 adapted to remove overhead by means of line 18 hydrogen sulphide and steam. The overhead fraction is condensed in condenser 19 and passed to separator 20 by means of line 21 from which reflux may be returned to unit 16 by means of line 24. Hydrogen sulphide and steam are removed from the system by means of line 22, while a portion of the lower layer comprising water may be recycled to absorption plant 1, by means of line 23. Phenol substantially free of hydrogen sulphide and water is withdrawn from the bottom of distillation unit 16 by means of line 17 and recycled to the spent potassium phosphate solution in mixer 6 as described.

The process of the present invention may be widely varied. The process may be adapted for the efficient and economical regeneration of spent alkali metal phosphate solutions which have been utilized in the removal of sulphur compounds from any type of sulphur-bearing oil. The process, however, is particularly applicable in the regeneration of spent tri-potassium phosphate which has been utilized in the removal of hydrogen sulphide from petroleum hydrocarbons, particularly from petroleum hydrocarbon gases. Although the process is applicable to the regeneration of any spent alkali metal phosphate solution, as for example, tri-soduim phosphate, it is particularly applicable in the regeneration of potassium phosphate solutions, as for example, tri-potassium phosphate.

Although any phenol may be utilized in the manner described, as for example, cresol and the like, I have found that it is desirable to use mono-hydroxy phenol. The amount of phenol utilized will vary considerably, depending upon the particular alkali metal phosphate solution employed, as well as upon the extent to which the same has been spent. For example, when regenerating a 10% to 50% aqueous solution of tri-potassium phosphate which has been spent with hydrogen sulphide to the extent of 40% to 70%, it is preferred that from 5% to 20% of phenol by volume be added. A particularly desirable modification of the present invention comprises a sequence of stages in which the spent potassium phosphate phenol solution is concentrated to less than one-half of its original value, preferably to about one-fourth of its original value, prior to steam stripping the same. When utilizing this sequence of stages it has been found that substantially the entire quantity of phenol is removed from the regenerated phosphate solution by the use of an equivalent quantity of steam.

In order to further illustrate the invention, the following examples are given which should not be construed as limiting the same in any manner whatsoever:

Example 1

An aqueous solution comprising 20% of tri-potassium phosphate was spent to the extent of 50% with hydrogen sulphide gas and mixed with 9% of phenol. The mixture was then refluxed for two hours and steam distilled, under conditions in which the concentration of the potassium phosphate solution was maintained at approximately 20%. It was found that this resulted in the complete removal of hydrogen sulphide from the tri-potassium phosphate solution. Furthermore, the phenol present was reduced approximately 60% by the use of 2½ volumes of steam during the stripping operation.

Example 2

In another operation carried out under identical conditions except that the 20% tri-potassium phosphate-phenol solution was concentrated to about one-fourth volume prior to steam stripping, it was found that in excess of 98% of the phenol was removed from the tri-potassium phosphate-phenol solution by the use of the same quantity of steam.

Example 3

In an operation conducted as described with respect to Example 2 except that phenol was not employed, it was found that this treatment reduced the per cent spent from 50% to 8%.

The present invention permits the use of smaller quantities of solution cycled through the absorption stage and thus results in a reduction in treating losses. Furthermore, the present process by securing a higher degree of regeneration renders the solution considerably more efficient and thus permits the removal of relatively low concentrations of hydrogen sulphides from liquids or gases.

The present process is not to be limited by any theory or mode of operation, but only in and by the following claims in which it is desired to claim all novelty in so far as the prior art permits.

I claim:

1. Process for removing hydrogen sulphide from petroleum hydrocarbons, comprising absorbing the hydrogen sulphide in a solution of alkali metal phosphate substantially free from phenolic compounds, mixing the spent alkali metal phosphate solution with a phenol, distilling the mixture under conditions to segregate hydrogen sulphide, substantially phenol-free alkali metal phosphate solution, and substantially pure phenol, recycling the regenerated alkali metal phosphate solution to the absorption stage, and recycling the phenol to said mixing stage.

2. Process according to claim 1, in which the alkali metal phosphate solution is a tripotassium phosphate solution.

3. Process according to claim 1, in which the mixture of spent alkali metal phosphate solution and a phenol is concentrated to a predetermined volume and then treated with steam, whereby hydrogen sulphide and substantially phenol-free regenerated alkali metal phosphate solutions are secured.

REGINALD K. STRATFORD.